(No Model.)

N. D. MOREY.
Dish Heater.

No. 230,039. Patented July 13, 1880.

Witnesses:
W. C. McArthur
John C. Rogers

Inventor.
Nathan D. Morey
per T. K. Alexander
Attorney.

UNITED STATES PATENT OFFICE.

NATHAN D. MOREY, OF SARATOGA SPRINGS, NEW YORK.

DISH-HEATER.

SPECIFICATION forming part of Letters Patent No. 230,039, dated July 13, 1880.

Application filed April 22, 1880. (No model.)

*To all whom it may concern:*

Be it known that I, NATHAN D. MOREY, of Saratoga Springs, in the county of Saratoga and State of New York, have invented certain new and useful Improvements in Dish-Heaters; and I do hereby declare that the following is a full, clear, and exact description thereof, reference being had to the accompanying drawings, and to the letters of reference marked thereon, which form part of this specification, in which—

Figure 1:
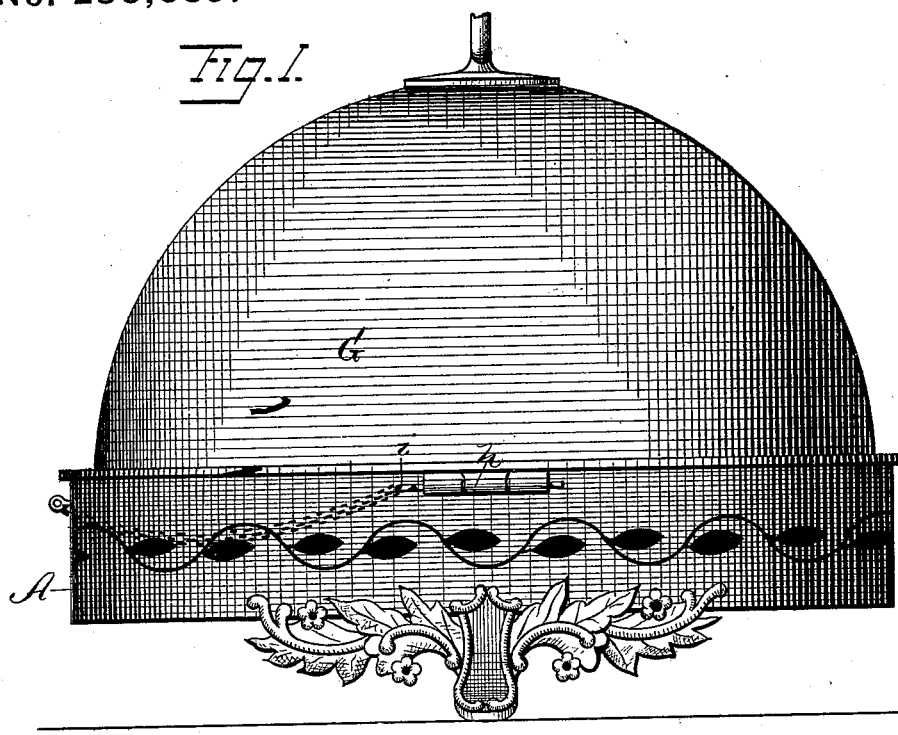
Figure 2:
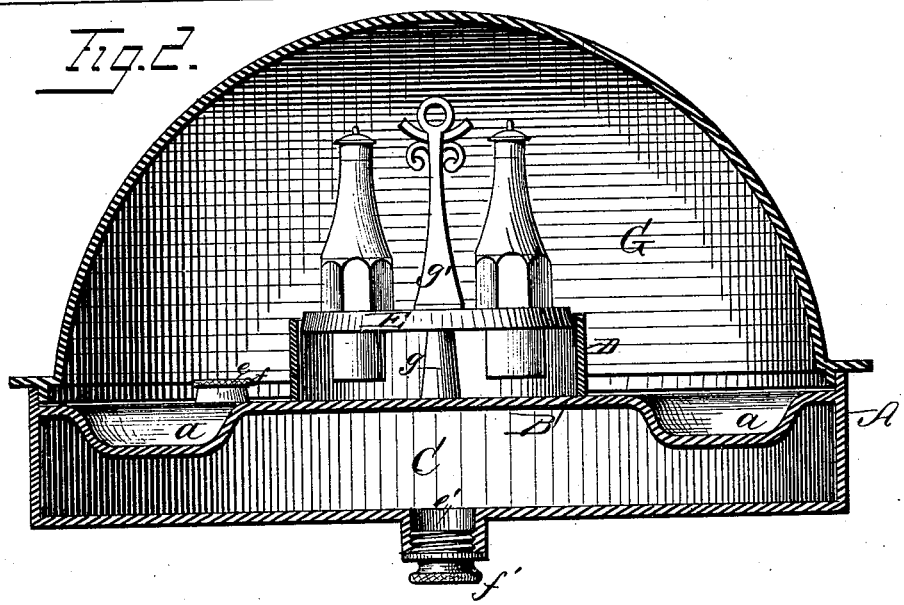

Figure 1 is a side elevation, and Fig. 2 a central vertical section.

The object of my invention is to provide a convenient and useful device for the breakfast and dining table, whereby the various meats and vegetables may not only be kept warm, but all may be contained under the same cover and served at the same time; and to this end it consists in constructing a dish with a receptacle for hot water, which can be at pleasure introduced or drawn off, and forming the roof of the water-chamber with suitable cavities or dishes for the reception of the meats and vegetables; also, in providing a caster which is removably secured at the center of the main dish, and covering the whole with a lid capable of either swinging or opening from one of two sides, or being removed altogether.

To enable others skilled in the art to make and use my invention, I will now describe it more specifically.

A represents the main dish, which may be constructed in any desirable shape and ornamented to suit the fancy. B is the roof, in which are formed the receptacles $a\ a$ for meats and vegetables. If desirable, removable pans or dishes may be inserted in lieu of the permanent receptacles shown in the drawings. C is the water-chamber, the water being introduced through the aperture $e$ in roof B and allowed to escape through aperture $e'$ in the bottom of the dish. These apertures are furnished with screws or other suitable devices $f f'$.

D represents a broad band secured around the center of roof B, in which is the post $g$. This post is provided with a female screw at its top, and the caster E is held in position and permitted to revolve by the caster-handle $g'$ being screwed therein.

G represents the dome or lid of dish A, the two being connected on opposite sides by hinges $h\ h$. $i\ i$ are the hinge-pins, which have chains attached to them. These pins being easily removable, either side of the lid may be thrown back, or, if desirable, it may be taken off entirely.

I am fully aware that it is not new to keep vegetables and meats warm by means of dishes having a hot-water chamber, and therefore I do not wish to claim, broadly, a utensil of this nature; but What I do claim, and desire to secure by Letters Patent, is—

1. The dish A, having hinged and removable cover or dome G, and provided with a hot-water chamber and several receptacles for meats and vegetables, all substantially as and for the purpose set forth.

2. The within-described heating-dish, consisting of body A, hinged and removable lid G, receptacles $a\ a$, and caster E, and hot-water chamber C, all as and for the purpose set forth.

In testimony that I claim the foregoing as my own I affix my signature in presence of two witnesses.

NATHAN D. MOREY.

Witnesses:
L. VARNEY,
D. S. GILBERT.